United States Patent
Ryu et al.

(10) Patent No.: US 11,924,855 B2
(45) Date of Patent: Mar. 5, 2024

(54) SIDELINK DORMANCY

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Fairless Hills, PA (US); Jelena Damnjanovic, Del Mar, CA (US); Peter Gaal, San Diego, CA (US); Ozcan Ozturk, San Diego, CA (US); Jing Sun, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 17/482,300

(22) Filed: Sep. 22, 2021

(65) Prior Publication Data

US 2022/0095139 A1 Mar. 24, 2022

Related U.S. Application Data

(60) Provisional application No. 63/082,408, filed on Sep. 23, 2020.

(51) Int. Cl.
| | |
|---|---|
| *H04W 72/25* | (2023.01) |
| *H04L 5/00* | (2006.01) |
| *H04W 72/0453* | (2023.01) |
| *H04W 24/08* | (2009.01) |
| *H04W 72/20* | (2023.01) |

(52) U.S. Cl.
CPC ............. *H04W 72/25* (2023.01); *H04L 5/001* (2013.01); *H04L 5/0053* (2013.01); *H04W 72/0453* (2013.01); *H04W 24/08* (2013.01); *H04W 72/20* (2023.01)

(58) Field of Classification Search
CPC .. H04W 72/25; H04W 72/0453; H04L 5/001; H04L 5/0053
See application file for complete search history.

(56) References Cited

U.S. PATENT DOCUMENTS

| | | | |
|---|---|---|---|
| 2020/0053675 A1* | 2/2020 | Khoryaev | ............... H04L 5/001 |
| 2020/0205165 A1* | 6/2020 | Huang | ................... H04L 1/1854 |

FOREIGN PATENT DOCUMENTS

WO  WO-2020033704 A1 *  2/2020

* cited by examiner

*Primary Examiner* — Kevin C. Harper
(74) *Attorney, Agent, or Firm* — Procopio, Cory, Hargreaves & Savitch LLP

(57) ABSTRACT

To facilitate SL dormancy, methods, apparatuses, and computer program products are provided. An example method of a UE includes monitoring for SCI in a first CC and refraining from monitoring for the SCI in a second CC, the first CC corresponding to a non-dormant CC, the second CC corresponding to a dormant CC. The method further includes receiving, from a second UE, the SCI in the first CC. The method further includes receiving, from the second UE, a PSSCH in the first CC or the second CC.

13 Claims, 15 Drawing Sheets

SIDELINK DORMANCY

CROSS REFERENCE TO RELATED APPLICATION(S)

This application claims the benefit of and priority to U.S. Provisional Application Ser. No. 63/082,408, entitled "SIDELINK DORMANCY" and filed on Sep. 23, 2020, which is expressly incorporated by reference herein in its entirety.

TECHNICAL FIELD

The present disclosure relates generally to communication systems, and more particularly, to sidelink (SL) communications with component carrier (CC) and dormancy.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as in V2X and/or other D2D communication. There exists a need for further improvements in V2X and/or other D2D technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect of the disclosure, a method, a computer-readable medium, and an apparatus are provided for wireless communication of a user equipment (UE). A first UE may monitor for SL control information (SCI) in a first component carrier (CC) and refrain from monitoring for the SCI in a second CC, the first CC corresponding to a non-dormant CC, the second CC corresponding to a dormant CC. For example, the UE may not monitor for any SCI in the second CC. The first UE may receive, from a second UE, the SCI in the first CC. The first UE may receive, from the second UE, a physical sidelink shared channel (PSSCH) in the first CC or the second CC.

In another aspect, a first UE may transmit, to a second UE, SCI in a first CC, the first CC corresponding to a dormant CC for the first UE. The first UE may transmit, to the second UE, a PSSCH in the first CC or a second CC, the second CC corresponding to a non-dormant CC for the first UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
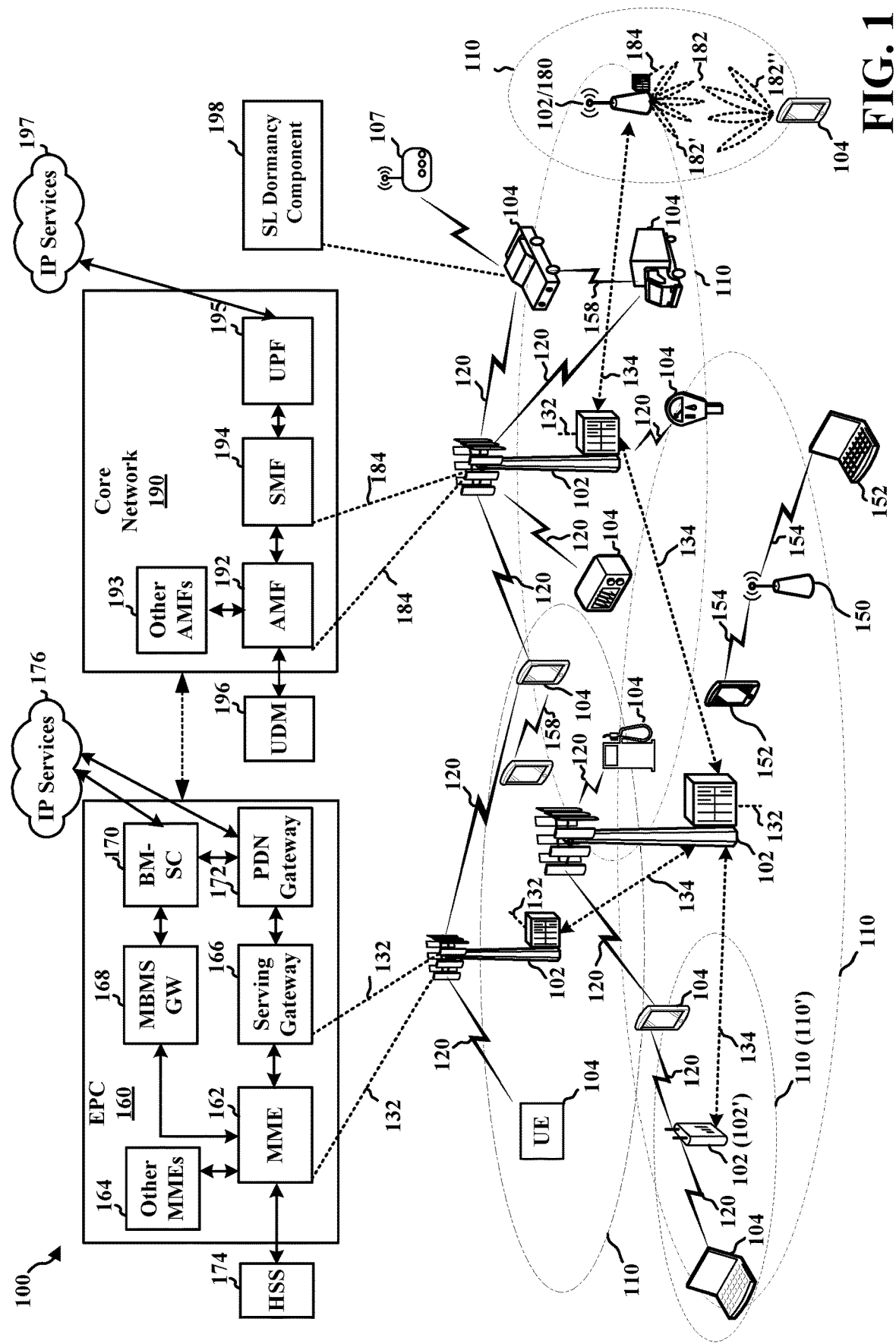
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an SL dormancy component 198 configured to monitor for SCI in a first CC and refrain from monitoring for the SCI in a second CC, the first CC corresponding to a non-dormant CC, the second CC corresponding to a dormant CC. The SL dormancy component 198 may be further configured to receive, from a second UE, the SCI in the first CC. The SL dormancy component 198 may be further configured to receive, from the second UE, a PSSCH in the first CC or the second CC.

In some aspects, the SL dormancy component 198 may be further configured to transmit, to a second UE, SCI in a first CC, the first CC corresponding to a dormant CC for the first UE. The SL dormancy component 198 may be further configured to transmit, to the second UE, a PSSCH in the first CC or a second CC, the second CC corresponding to a non-dormant CC for the first UE.

Figure 2:
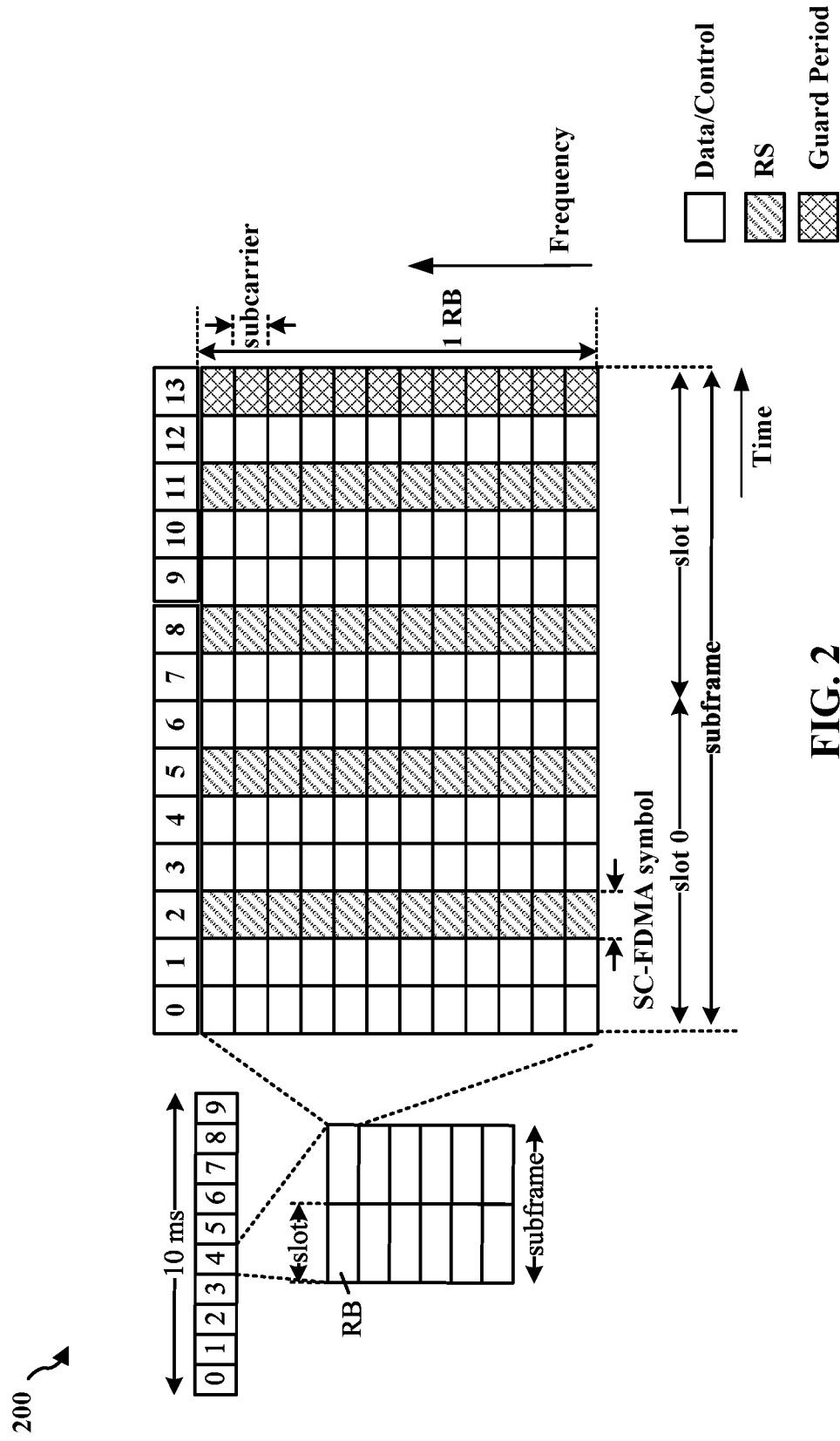
FIG. 2 illustrates example aspects of a sidelink slot structure.

FIG. 2 illustrates an example diagram 200 illustrating a sidelink subframe within a frame structure that may be used for sidelink communication, e.g., between UEs 104, between a UE and infrastructure, between a UE and an RSU, etc. The frame structure may be within an LTE frame structure. Although the following description may be focused on LTE, the concepts described herein may be applicable to other similar areas, such as 5G NR, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include two slots. Each slot may include 7 SC-FDMA symbols. For slot configuration 0, each slot may include 14 symbols, and for slot configuration 1, each slot may include 7 symbols. Although the diagram 200 illustrates a single RB subframe, the sidelink communication may include multiple RBs.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include a reference signal, such as a demodulation RS (DMRS). At least one symbol may be used for feedback, as described herein. A symbol prior to and/or after the feedback may be used for turnaround between reception of data and transmission of the feedback. Another symbol, e.g., at the end of the subframe may be used as a guard symbol without transmission/reception. The guard enables a device to switch from operating as a transmitting device to prepare to operate as a receiving device, e.g., in the following subframe. Data or control may be transmitted in the remaining REs, as illustrated. For example, data may be carried in a PSSCH, and the control information may be carried in a PSCCH. The control information may comprise Sidelink Control Information (SCI). The position of any of the reference signals, control, and data may be different than the example illustrated in FIG. 2.

Figure 3:
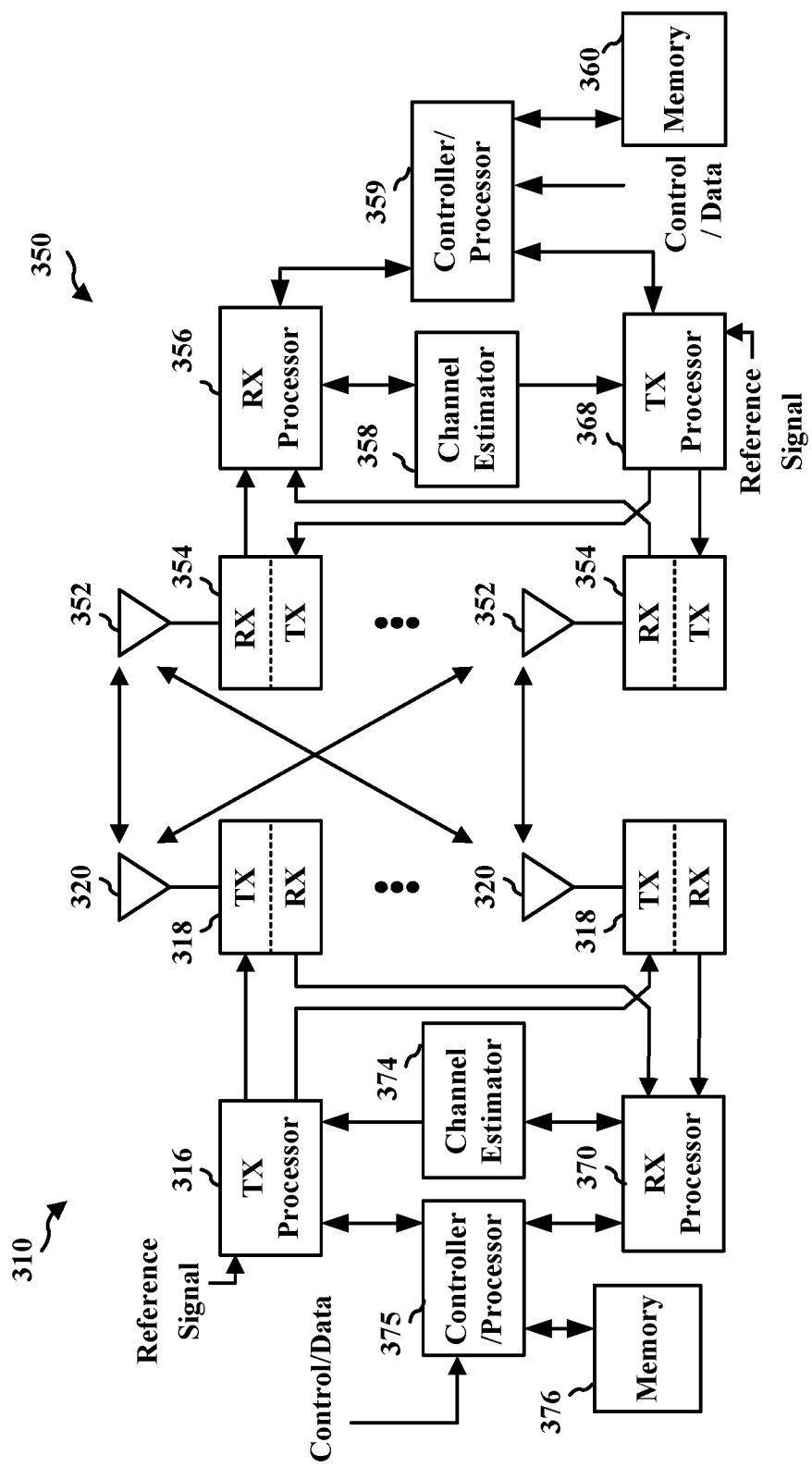
FIG. 3 is a diagram illustrating an example of a first device and a second device involved in wireless communication based, e.g., on V2X, and/or other device-to-device communication.

FIG. 3 is a block diagram 300 of a first wireless communication device 310 in communication with a second wireless communication device 350. In some examples, the devices 310 and 350 may communicate based on V2X or other D2D communication. The communication may be based, e.g., on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations. At least one of the TX processor 368, the RX processor 356, and the controller/processor 359 may be configured to perform aspects in connection with 198 of FIG. 1.

Figure 4:
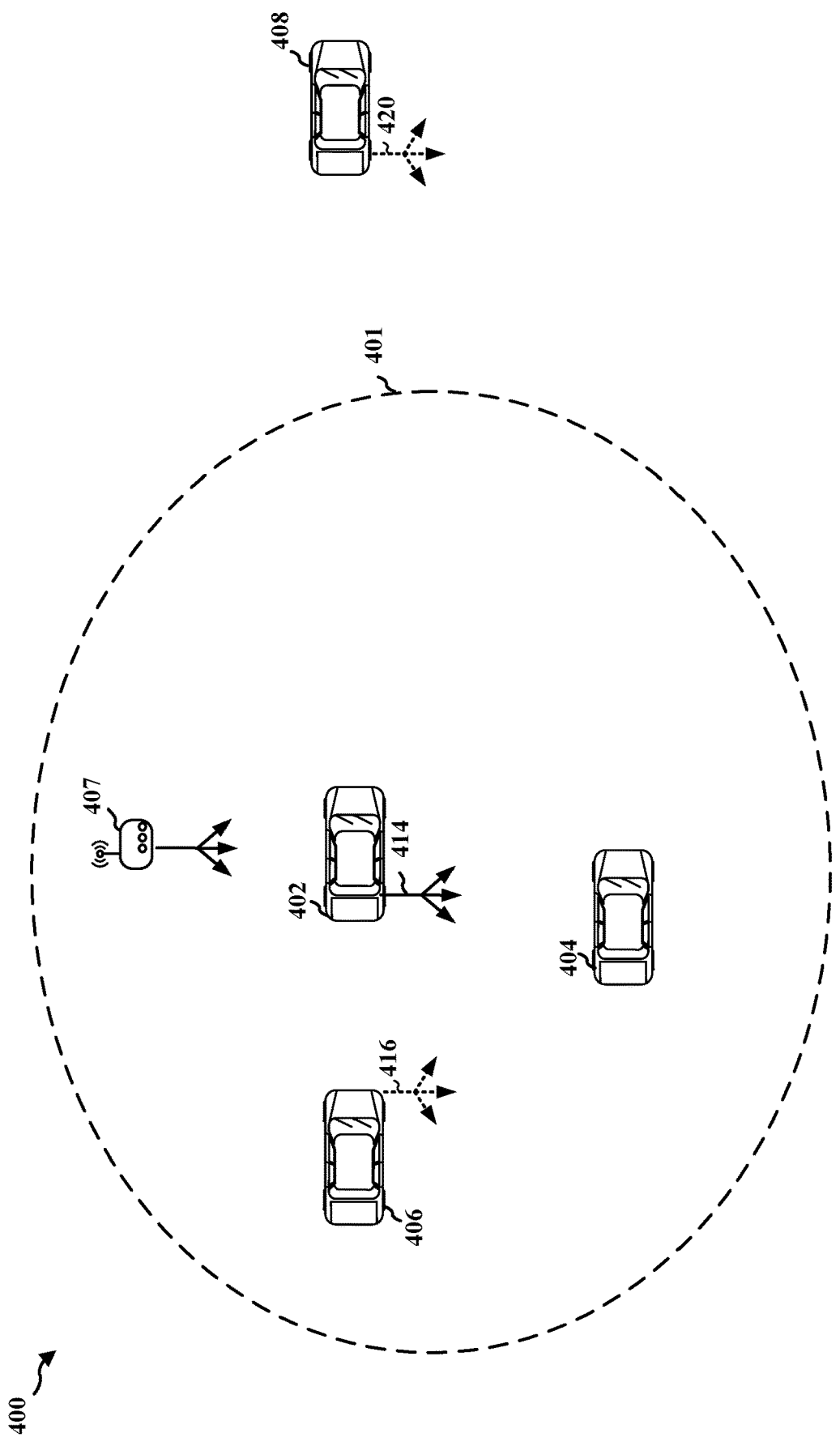
FIG. 4 illustrates an example of wireless communication between devices based on V2X/V2V/D2D communication.

FIG. 4 illustrates an example 400 of wireless communication between devices based on V2X/V2V/D2D communication. The communication may be based on a slot structure including aspects described in connection with FIG. 2. For example, transmitting UE 402 may transmit a transmission 414, e.g., including a control channel and/or a corresponding data channel, that may be received by receiving UEs 404, 406, 408. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 402, 404, 406, 408 may each be capable of operating as a transmitting device in addition to operating as a receiving device. Thus, UEs 406, 408 are illustrated as transmitting transmissions 416, 420. The transmissions 414, 416, 420 may be broadcast or multicast to nearby devices. For example, UE 402 may transmit communication intended for receipt by other UEs within a range 401 of UE 402. Additionally or alternatively, RSU 407 may receive communication from and/or transmit communication to UEs 402, 404, 406, 408.

In some wireless communication systems, radio interface or UE-to-UTRAN (Uu) interface dormancy may be applied to secondary cells (SCells). A UE may move an SCell to a dormant bandwidth part (BWP) and skip all PDCCH monitoring on the dormant SCell. The UE may receive CSI-RS and maintain automatic gain control (AGC) on the dormant SCell. For cross-carrier scheduling, if a scheduled SCell is in dormancy, the UE may not monitor PDCCH when the scheduled SCell is in dormancy. SCells may be moved in and out of dormancy in non-overlapping dormancy groups and each dormancy group may be assigned by one or more bits in downlink control information (DCI). After one or more DCI bits indicate to move an SCell out of dormancy, the SCell may move into a default first non-dormant BWP. A UE may stop uplink (UL) transmissions, suspend configured UL grant type 1, and clear configured UL grant type 2 in the dormant SCell. SRS transmissions such as aperiodic SRS, semi-periodic SRS, or periodic SRS, may not be supported in the dormant SCell. Uu interface dormancy may allow a UE to save power and switching from dormant to non-dormant status may be faster than SCell activation.

For SL communications, a base station may schedule SL communications and may transmit a DCI, such as a DCI 3_0 with resource allocation, to an SL transmission (Tx) UE (which may be referred to as a relaying UE) to facilitate the SL transmission. The SL Tx UE may transmit SCI1/SCI2 (PSCCH/PSSCH) to a SL receiving (Rx) UE. Some SL UEs may use carrier aggregation with multiple SL CCs. Not all SL CCs may be used all the time. Therefore, it may be advantageous to move some SL CCs into SL dormancy to save power.

Figure 5:
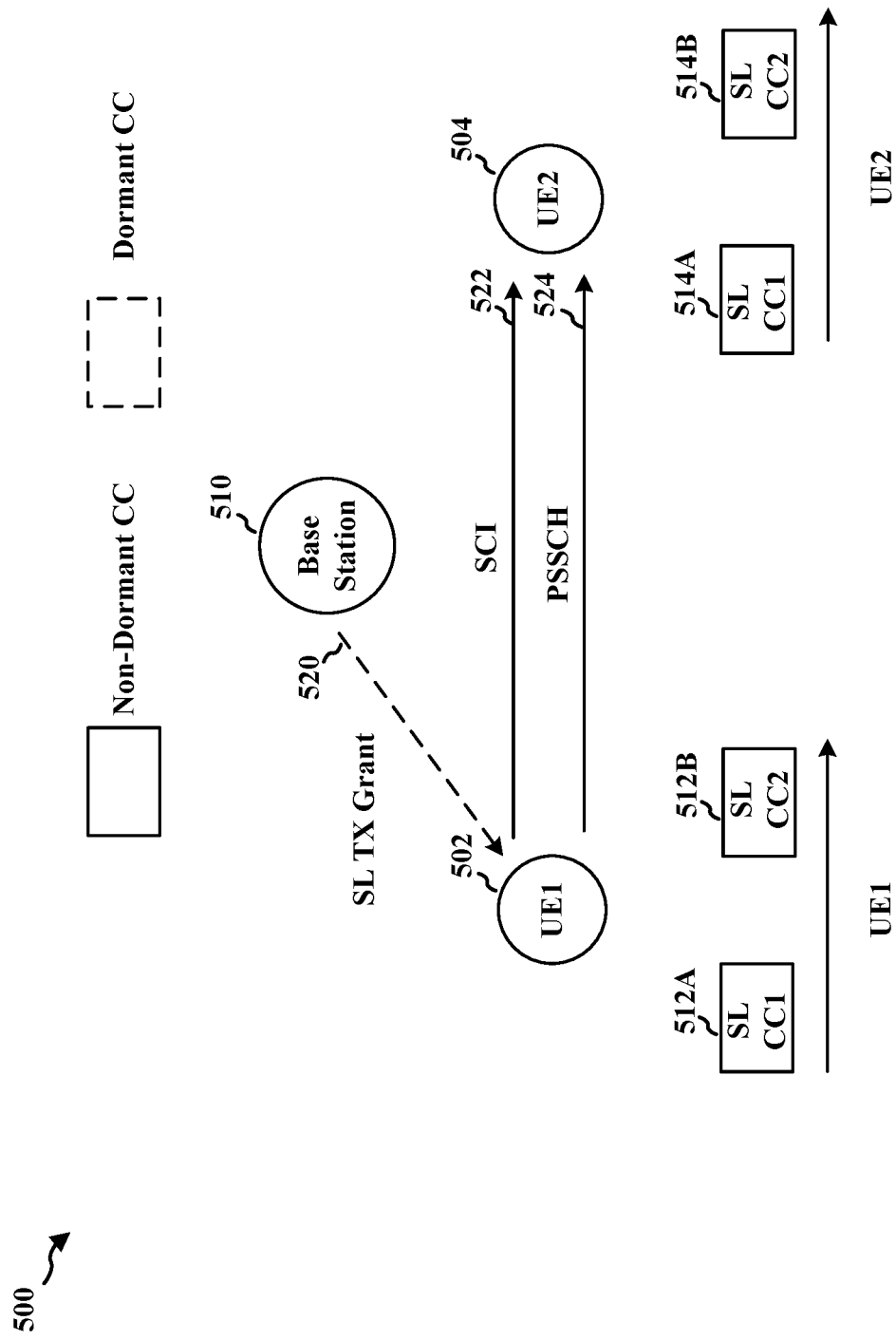
FIG. 5 illustrates an example of sidelink communications with CC dormancy.

As illustrated in the example 500 of FIG. 5, a base station 510 may transmit an SL Tx grant 520 to a UE1 502. The SL Tx grant 520 may indicate resources to use for SL Tx for the UE1 502. The UE1 502 may be the Tx UE and may transmit sidelink control information (SCI) 522 to a UE2 (Rx UE) 504 on an SL CC1 512A for the UE1 502 which corresponds to an SL CC1 514A for the UE2 504. The UE2 504 may receive the SCI on the SL CC1 514A. The UE1 502 may further transmit a PSSCH 524 to the UE2 504 on the SL CC1 512A and the UE2 504 may further receive the PSSCH 524 on the SL CC1 514A. Both the UE1 502 and the UE2 504 may use the SL CC1 512A/SL CC1 514A and the SL CC2 512B/SL CC2 514B for communications between the UE1 502 and the UE2 504. One of SL CC1 512A/514A or SL CC2 512B/514B may be moved into dormancy.

Figure 6:
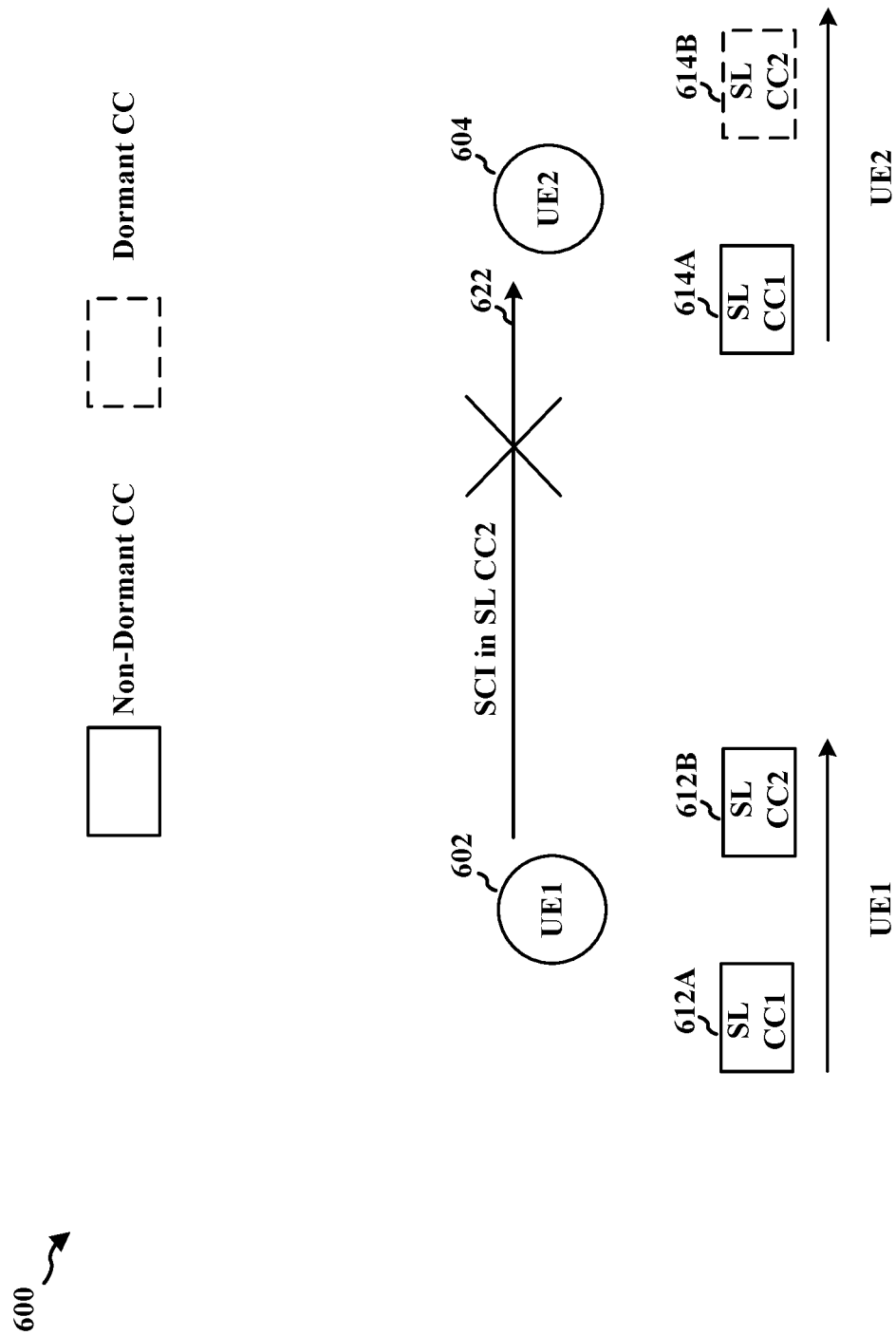
FIG. 6 illustrates an example of sidelink communications with CC dormancy.

As illustrated in example 600 of FIG. 6, for communications between a UE1 602 and a UE2 604 that may use an SL CC1 612A for UE1 602 that corresponds with an SL CC1 614A for UE2 604 and an SL CC2 612B for UE1 602 that corresponds with an SL CC2 614B for UE2 604, in some aspects, if the SL CC2 614B is dormant, the UE2 604 may not monitor SCI on the SL CC2 614B. Therefore, the UE1 602 may not transmit SCI 622 on the SL CC2 612B and SCI 622 may be transmitted on the SL CC1 612A and received on the SL CC1 614A instead. The UE2 604 may save power from not monitoring for SCI on the SL CC2 614B.

Figure 7:
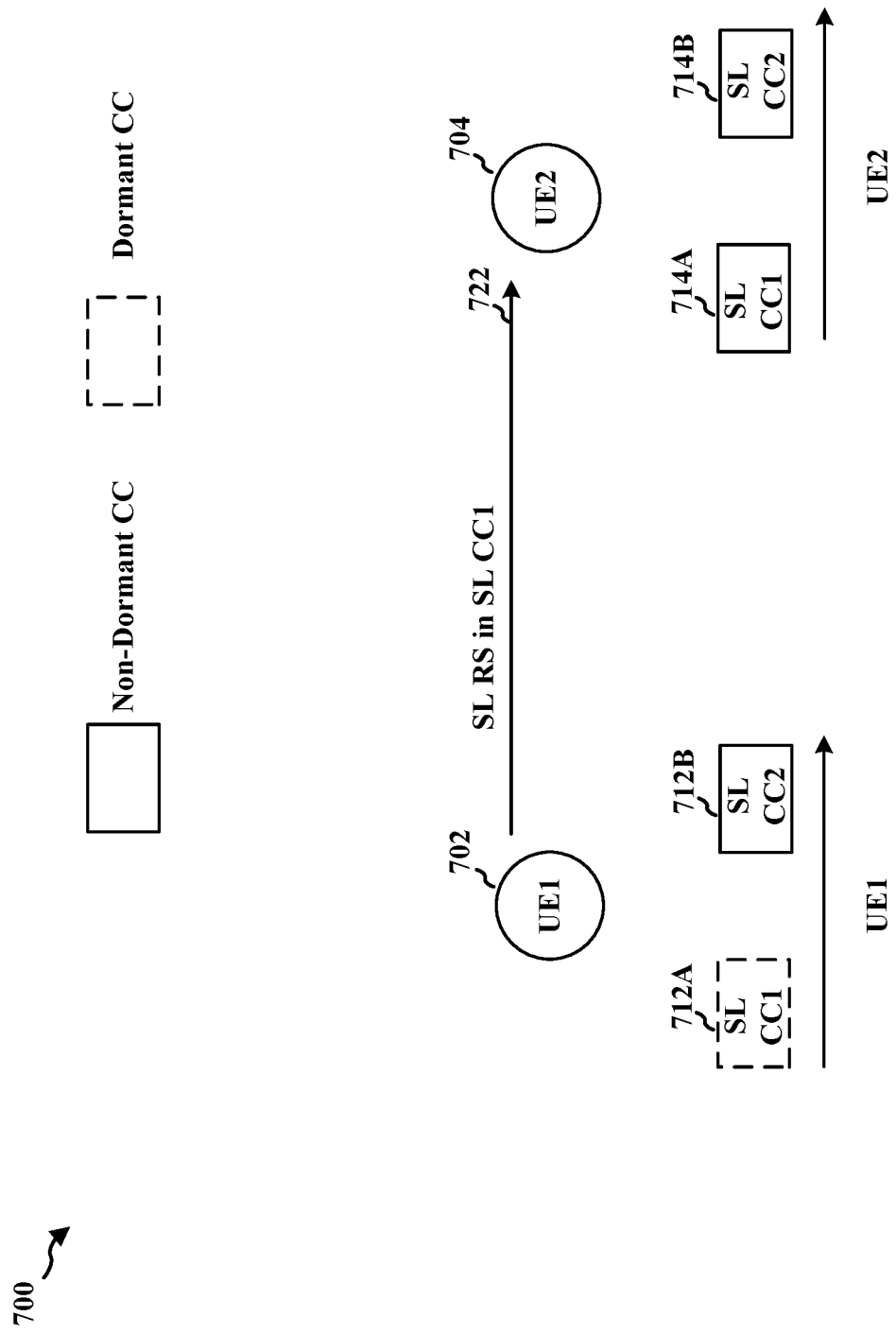
FIG. 7 illustrates an example of sidelink communications with CC dormancy.

As illustrated in example 700 of FIG. 7, for communications between a UE1 702 and a UE2 704 that may use an SL CC1 712A for the UE1 702 that corresponds with an SL CC1 714A for the UE2 704 and an SL CC2 712B for the UE1 702 that corresponds with an SL CC2 714B for the UE2 704, in some aspects, the UE1 702 may be dormant in the SL CC1 712A. In some aspects, the UE1 702 may transmit SL reference signal (RS) 722 in the dormant SL CC1 712A. In some aspects, the UE1 702 may not transmit SL RS in the dormant SL CC1 712A.

Figure 8:
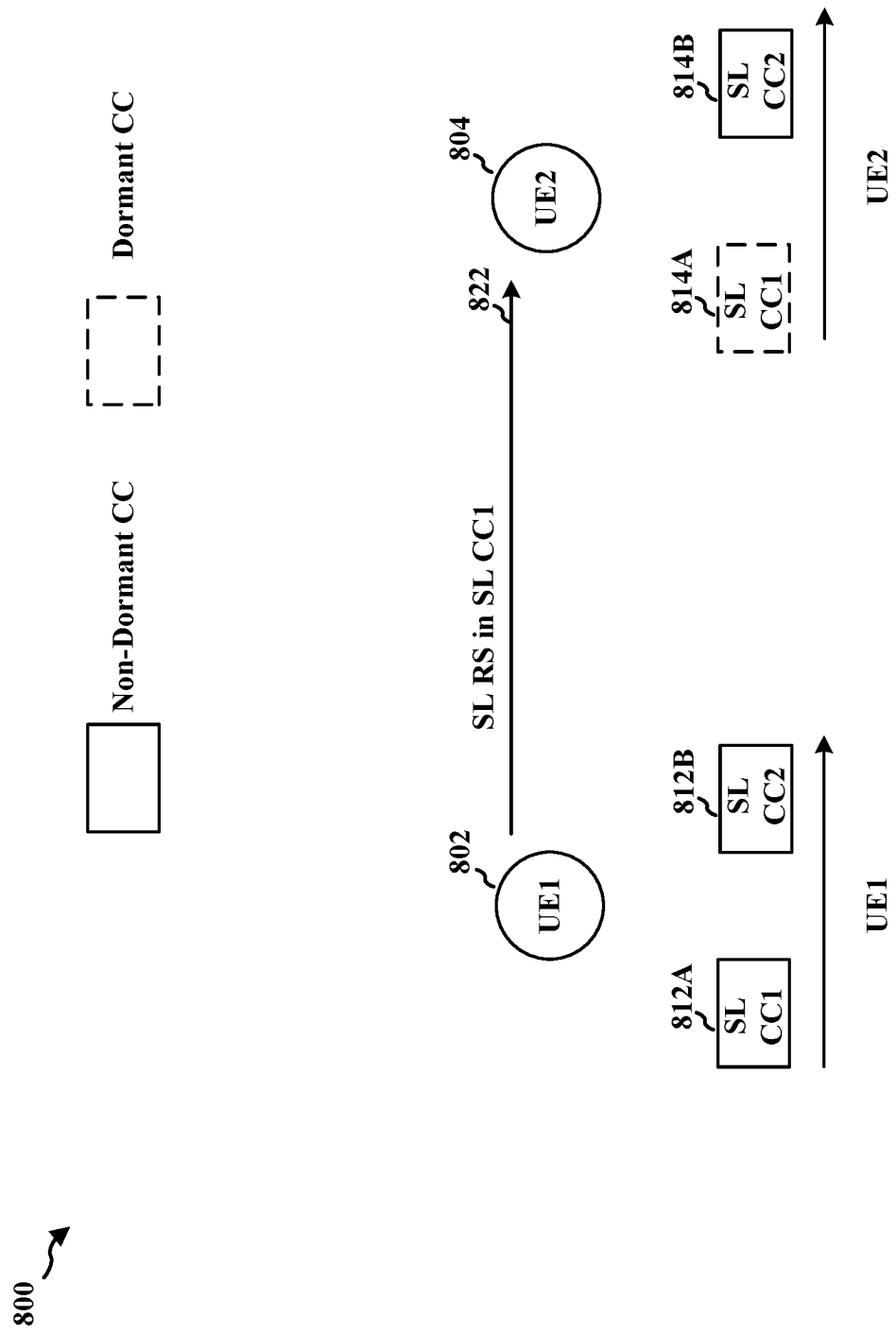
FIG. 8 illustrates an example of sidelink communications with CC dormancy.

As illustrated in example 800 of FIG. 8, for communications between a UE1 802 and a UE2 804 that may use an SL CC1 812A for the UE1 802 that corresponds with an SL CC1 814A for the UE2 804 and an SL CC2 812B for the UE1 802 that corresponds with an SL CC2 814B for the UE2 804, in some aspects, the UE2 804 may be dormant in the SL CC1 814A. The UE2 804 may receive SL RS 822 in the dormant SL CC1 814A.

Figure 9:
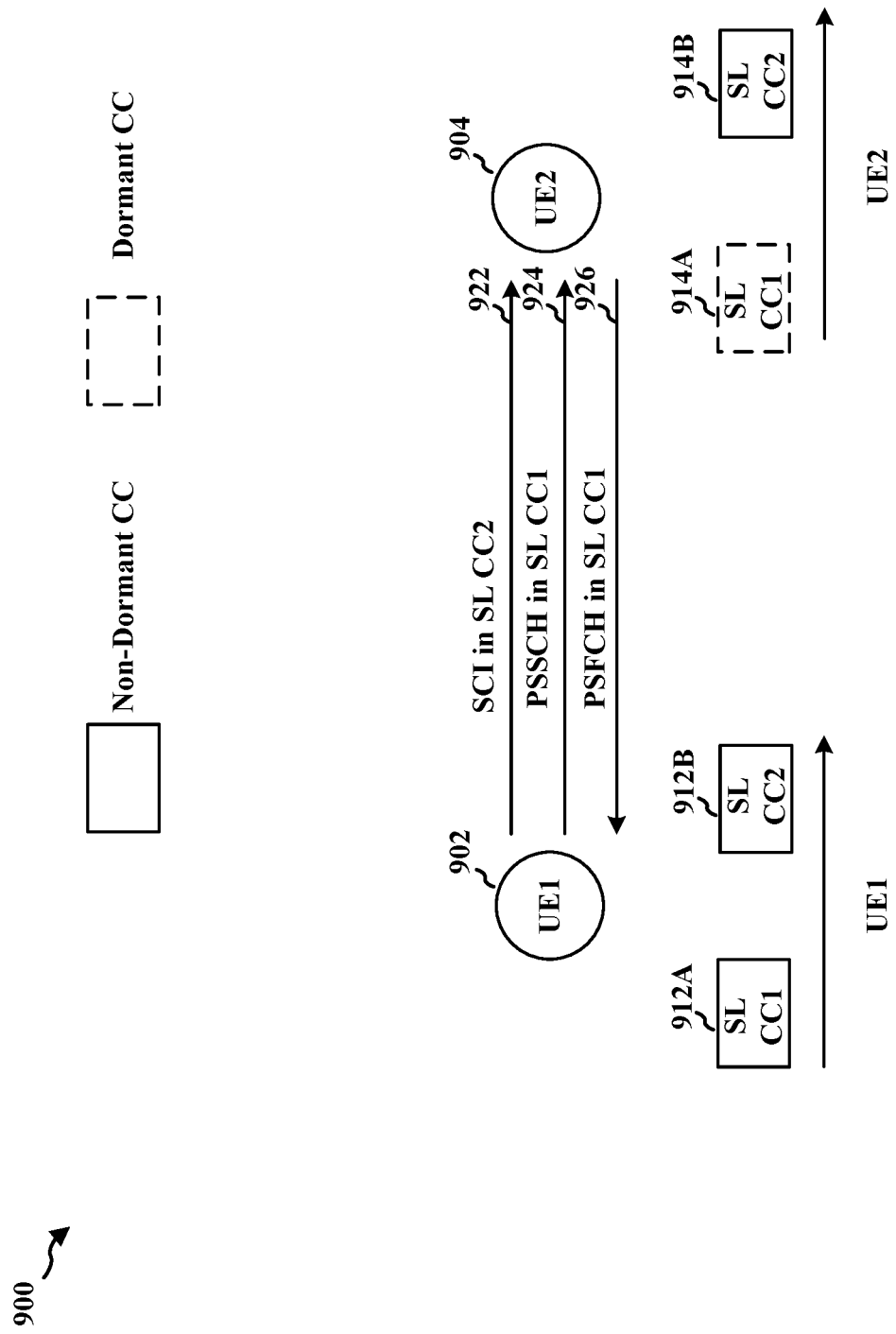
FIG. 9 illustrates an example of sidelink communications with CC dormancy.

As illustrated in example 900 of FIG. 9, for communications between a UE1 902 and a UE2 904 that may use an SL CC1 912A for the UE1 902 that corresponds with an SL CC1 914A for the UE2 904 and an SL CC2 912B for the UE1 902 that corresponds with an SL CC2 914B for the UE2 904, the UE2 904 may be dormant in the SL CC1 914A. In some aspects, the UE2 904 may receive a PSSCH and transmit a physical sidelink feedback channel (PSFCH) in the dormant SL CC1 914A. For example, the UE2 904 may monitor for and receive SCI 922 in SL CC2 914B. The SCI may indicate resources to be used for a PSSCH transmission in the SL CC1 912A and the corresponding PSSCH reception in the SL CC1 914A. The SCI may also indicate Tx parameters. In another example, the UE1 902 may further transmit a PSSCH 924 in the SL CC1 912B and the UE2 904 may receive the PSSCH 924 in the SL CC1 914B. The UE2 904 may transmit a PSFCH 926 in response to the PSSCH 924 to the UE1 902 in the SL CC1 914B. In some alternative aspects, the UE2 904 may not receive the PSSCH or transmit the PSFCH in the dormant SL CC1 914A.

Figure 10:
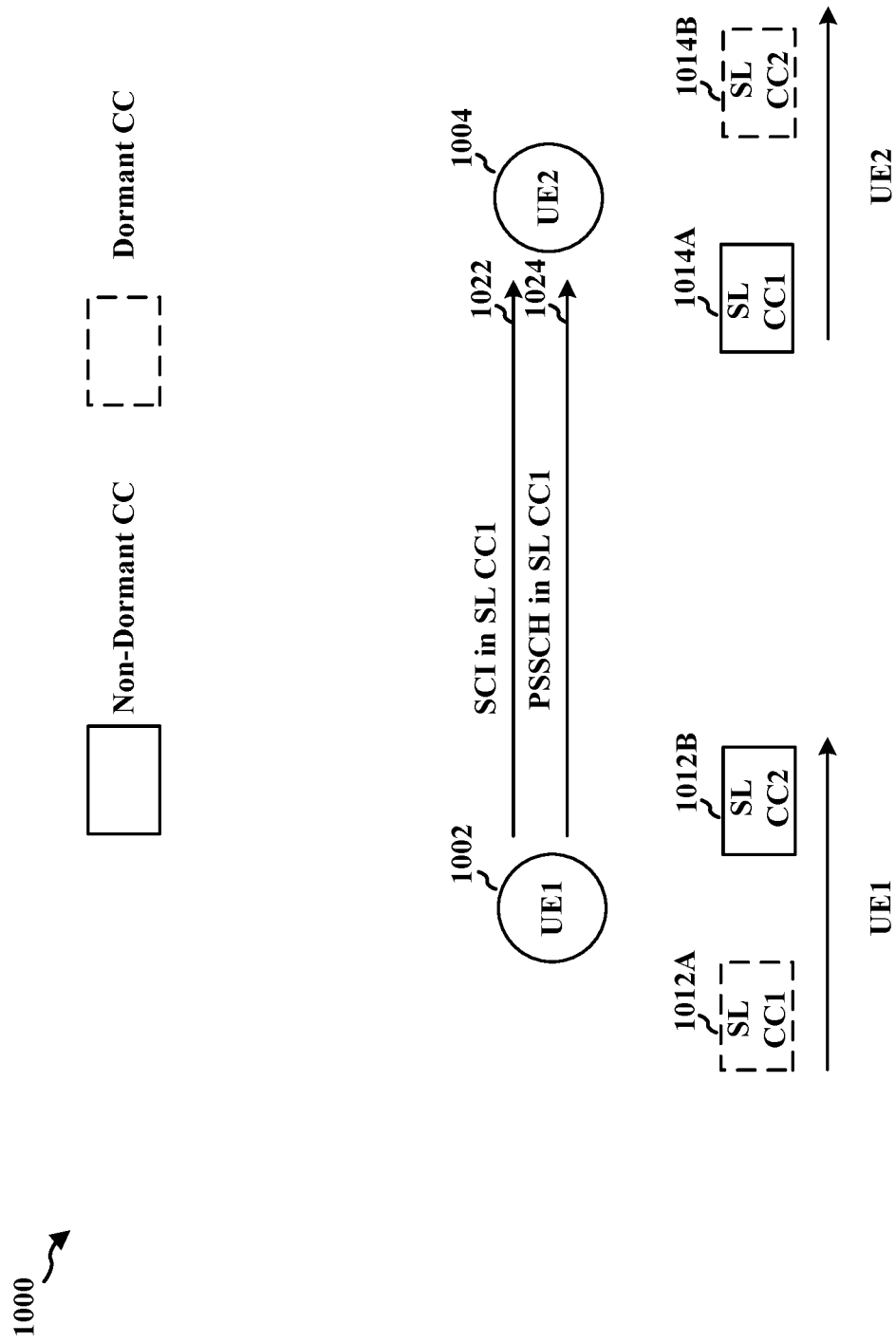
FIG. 10 illustrates an example of sidelink communications with CC dormancy.

As illustrated in example 1000 of FIG. 10, for communications between a UE1 1002 and a UE2 1004 that may use an SL CC1 1012A for the UE1 1002 that corresponds with an SL CC1 1014A for the UE2 1004 and an SL CC2 1012B for the UE1 1002 that corresponds with an SL CC2 1014B for the UE2 1004, in some aspects, the UE1 1002 may be dormant in the SL CC1 1012A and the UE2 1004 may be dormant in the SL CC2 1014B. The UE1 1002 may transmit SCI 1022 in the dormant SL CC1 1012A. The UE2 1004 may receive the SCI 1022 in the non-dormant SL CC1 1014A. The UE1 1002 may transmit a PSSCH 1024 in the dormant SL CC1 1012A and the UE2 1004 may receive the PSSCH 1024 in the non-dormant SL CC1 1014A. In some alternative aspects, the UE1 1002 may refrain from transmitting SCI in the dormant SL CC1 1012A and may refrain from transmitting PSSCH in the dormant SL CC1 1012A.

Figure 11:
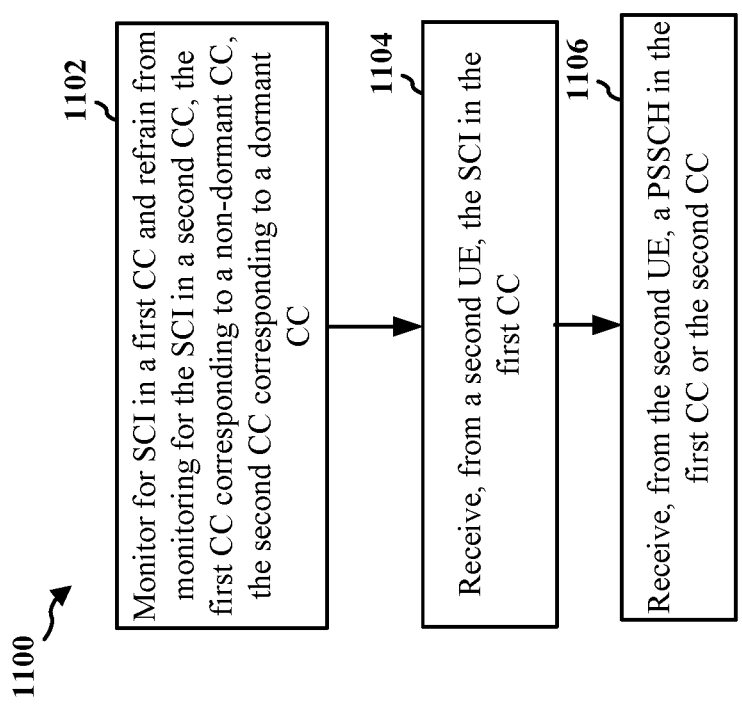
FIG. 11 is a flowchart of method of wireless communication.

FIG. 11 is a flowchart of method 1100 of wireless communication. The method 1100 in FIG. 11 may be performed by a UE (e.g., the UE 104, UE 504, the UE 604, the UE 704, the UE 804, the UE 904, the UE 1004, the apparatus 1502).

At 1102, e.g., as described in connection with FIGS. 6-10, the UE may monitor for SCI in a first CC and refrain from monitoring for the SCI in a second CC. For example, the UE may not monitor for any SCI in the second CC. The first CC may correspond to a non-dormant CC, the second CC may correspond to a dormant CC. For example, the UE2 604 may refrain from monitoring for SCI, i.e., not monitor SCI, in SL CC2 at 622. The UE2 604 may monitor for SCI in SL CC1 614A. In some aspects, 1102 may be performed by SL component 1540 of FIG. 15.

At 1104, e.g., as described in connection with FIGS. 6-10, the UE may receive, from a second UE, the SCI in the first CC. For example, the UE2 604 may receive SCI from the UE1 602 on the SL CC1 614A. In some aspects, 1104 may be performed by reception component 1530 of FIG. 15.

At 1106, e.g., as described in connection with FIGS. 6-10, the UE may receive, from the second UE, a PSSCH in the first CC or the second CC. For example, the UE2 1004 may receive a PSSCH in SL CC1 1014A or in SL CC2 1014B. In some aspects, 1106 may be performed by the reception component 1530 of FIG. 15. In some aspects, the first CC may correspond to a second dormant CC of the second UE and the second CC may correspond to a second non-dormant CC of the second UE. In some aspects, the PSSCH is received in the first CC and the SCI is received in the first CC.

Figure 12:
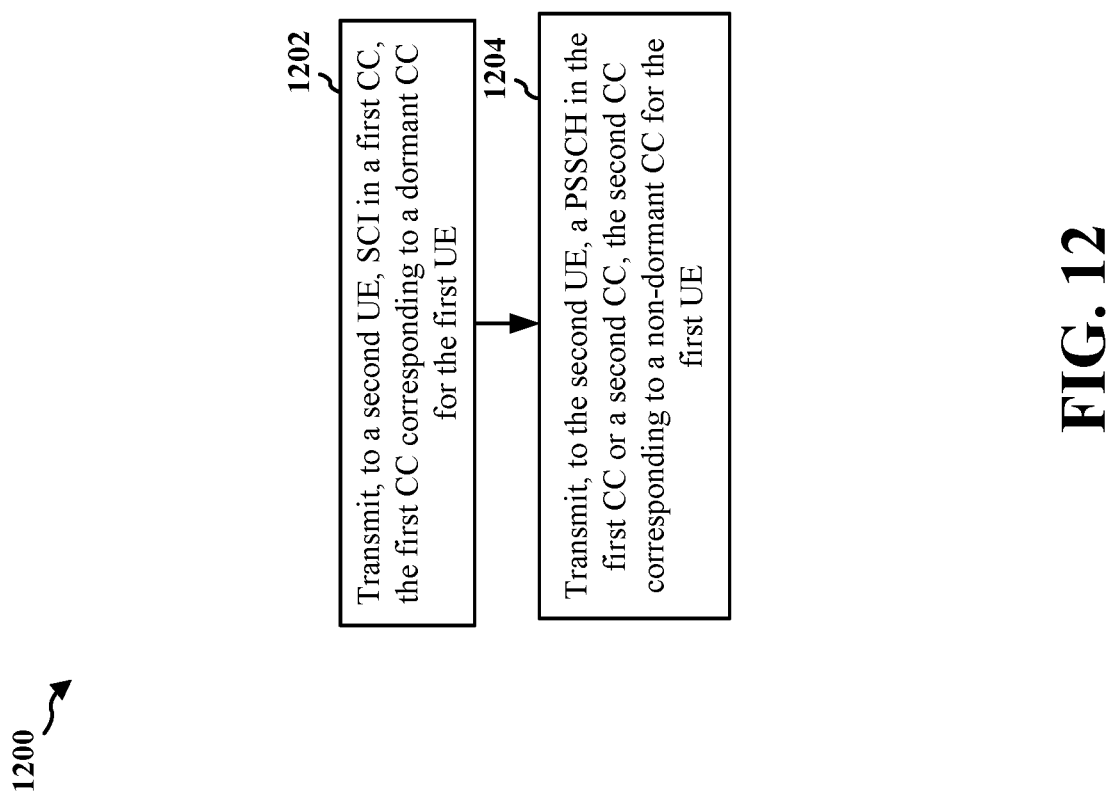
FIG. 12 is a flowchart of method of wireless communication.

FIG. 12 is a flowchart of method 1200 of wireless communication. The method 1200 in FIG. 12 may be performed by a UE (e.g., the UE 104, UE 502, the UE 602, the UE 702, the UE 802, the UE 902, the UE 1002, the apparatus 1502).

In some aspects, the UE may receive, from a base station, a sidelink transmission grant. The sidelink transmission grant may correspond to the sidelink transmission grant 520 described in connection with FIG. 5.

At 1202, e.g., as described in connection with FIGS. 6-10, the UE may transmit, to a second UE, SCI in a first CC. The first CC may correspond to a dormant CC for the first UE. For example, the UE1 1002 may transmit, to a second UE 1004, SCI 1022 in SL CC1 1012A or SL CC2 1012B. In some aspects, 1202 may be performed by transmission component 1534 of FIG. 15.

At 1204, e.g., as described in connection with FIGS. 6-10, the UE may transmit, to the second UE, a PSSCH in the first CC or a second CC. The second CC may correspond to a non-dormant CC for the first UE. For example, the UE1 1002 may transmit a PSSCH in SL CC1 at 1024. In some aspects, 1204 may be performed by transmission component 1534 of FIG. 15. In some aspects, the first CC may correspond to the dormant CC and the second CC may correspond to the non-dormant CC. In some aspects, the first CC may correspond to a second non-dormant CC of the second UE and the second CC may correspond to a second dormant CC of the second UE. In some aspects, the PSSCH may be transmitted in the first CC.

Figure 13:
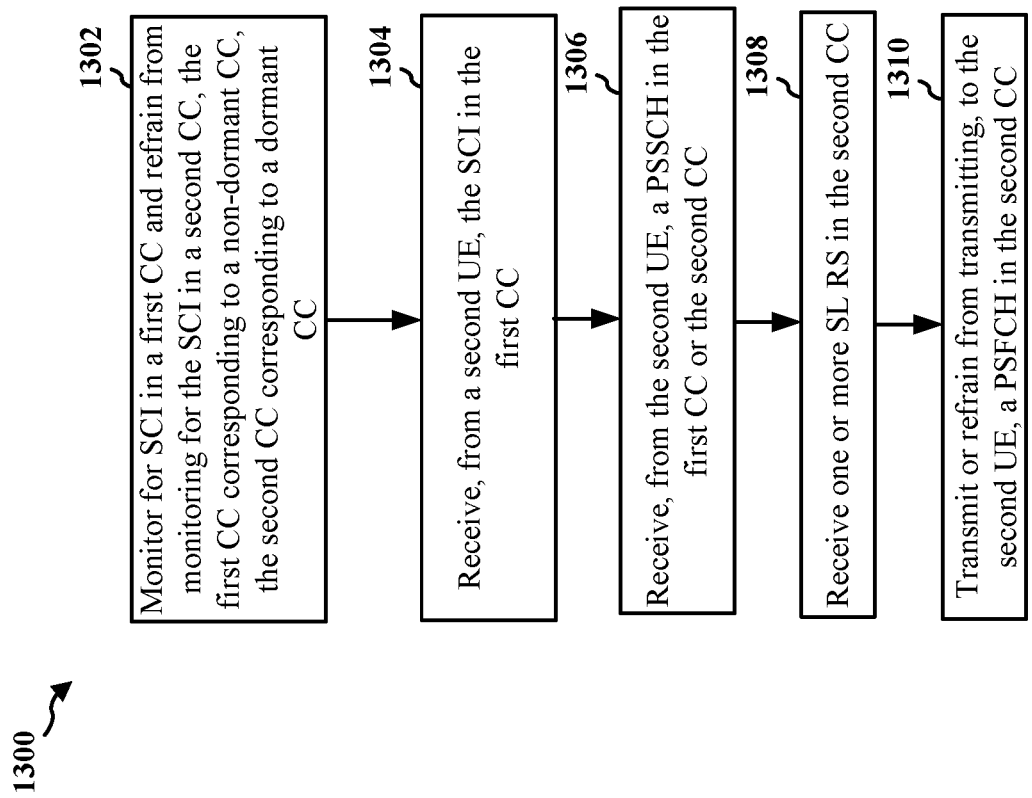
FIG. 13 is a flowchart of method of wireless communication.

FIG. 13 is a flowchart of method 1300 of wireless communication. The method 1300 in FIG. 13 may be performed by a UE (e.g., the UE 104, UE 504, the UE 604, the UE 704, the UE 804, the UE 904, the UE 1004, the apparatus 1502).

At 1302, e.g., as described in connection with FIGS. 6-10, the UE may monitor for SCI in a first CC and refrain from monitoring for the SCI in a second CC. For example, the UE may not monitor for any SCI in the second CC. The first CC may correspond to a non-dormant CC, the second CC may correspond to a dormant CC. For example, the UE2 1004 may refrain from monitoring for SCI, i.e., not monitor SCI, in SL CC2 at 1022. The UE2 1004 may monitor for SCI in SL CC1 1014A. In some aspects, 1302 may be performed by SL component 1540 of FIG. 15.

At 1304, e.g., as described in connection with FIGS. 6-10, the UE may receive, from a second UE, the SCI in the first CC. For example, the UE2 1004 may receive SCI from the UE1 1002 on the SL CC1 1014A. In some aspects, 1304 may be performed by reception component 1530 of FIG. 15.

At 1306, e.g., as described in connection with FIGS. 6-10, the UE may receive, from the second UE, a PSSCH in the first CC or the second CC. For example, the UE2 1004 may receive a PSSCH in SL CC1 1014A or in SL CC2 1014B. In some aspects, 1306 may be performed by the reception component 1530 of FIG. 15. In some aspects, the first CC may correspond to a first dormant CC of the second UE and the second CC may correspond to a second non-dormant CC of the second UE. In some aspects, the PSSCH is received in the first CC and the SCI is received in the first CC.

At 1308, the UE may receive one or more SL RS in the first CC. For example, the UE 704 may receive SL RS in SL CC1 714A. In some aspects, 1308 may be performed by reception component 1530 of FIG. 15. In some aspects, the UE may refrain from receiving one or more SL RS in the first CC.

1310, the UE may transmit, to the second UE, a PSFCH in the second CC or refrain from transmitting a PSFCH in the second CC. For example, the UE 904 may transmit PSFCH in SL CC1 914A at 926 or refrain from transmitting PSFCH in SL CC1 914A. In some aspects, 1310 may be performed by transmission component 1534 of FIG. 15. The PSSCH may be received in the second CC.

Figure 14:
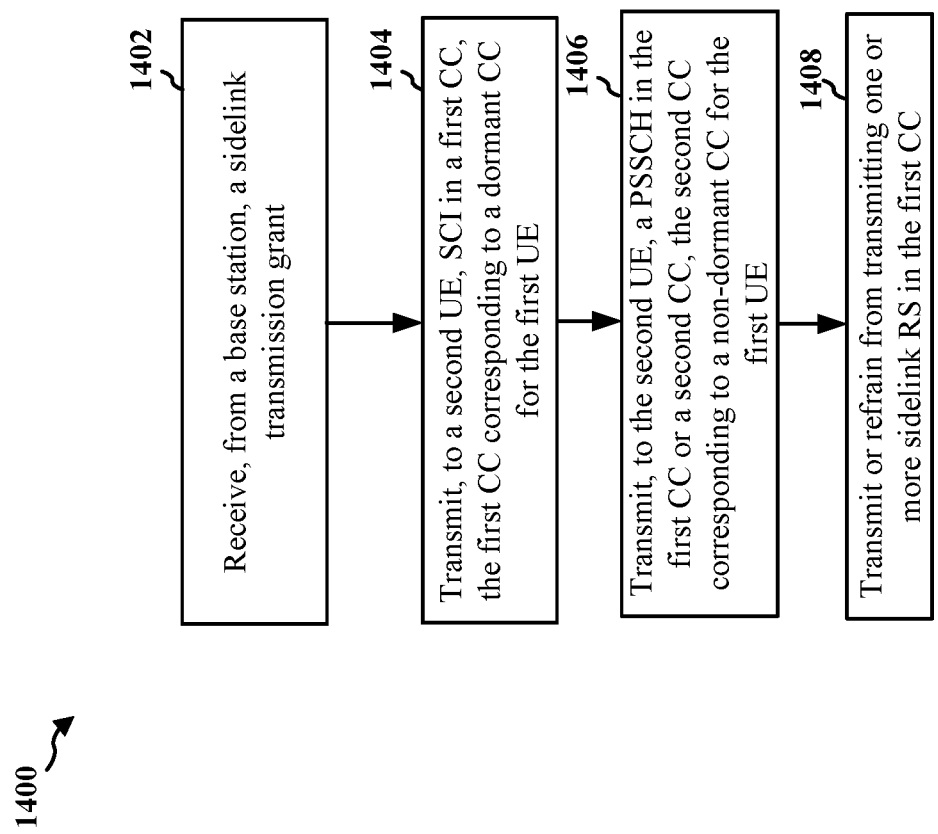
FIG. 14 is a flowchart of method of wireless communication.

FIG. 14 is a flowchart of method 1400 of wireless communication. The method 1400 in FIG. 14 may be performed by a UE (e.g., the UE 104, UE 502, the UE 602, the UE 702, the UE 802, the UE 902, the UE 1002, the apparatus 1502).

In some aspects, at 1402, the UE may receive, from a base station, a sidelink transmission grant. The sidelink transmission grant may correspond to the sidelink transmission grant described in connection with FIG. 5. For example, UE1 502 may receive, from base station 510, SL Tx grant 520. In some aspects, 1402 may be performed by reception component 1530 of FIG. 15.

At 1404, e.g., as described in connection with FIGS. 6-10, the UE may transmit, to a second UE, SCI in a first CC. The first CC may correspond to a dormant CC for the first UE. For example, the UE1 502 may transmit, to a second UE 504, SCI 522 in SL CC1 512A or SL CC2 514A. In some aspects, 1404 may be performed by transmission component 1534 of FIG. 15.

At 1406, e.g., as described in connection with FIGS. 6-10, the UE may transmit, to the second UE, a PSSCH in the first CC or a second CC. The second CC may correspond to a non-dormant CC for the first UE. For example, the UE1 1002 may transmit a PSSCH in SL CC1 at 1024. In some aspects, 1406 may be performed by transmission component 1534 of FIG. 15. In some aspects, the first CC may correspond to the dormant CC and the second CC may correspond to the non-dormant CC. In some aspects, the first CC may correspond to a second non-dormant CC of the second UE and the second CC may correspond to a second dormant CC of the second UE. In some aspects, the PSSCH may be transmitted in the first CC.

At 1408, the UE may transmit one or more sidelink RS in the first CC. In some alternative aspects, at 1408, the UE may refrain from transmitting one or more sidelink RS in the first CC. For example, the UE1 702 may transmit SL RS in CC1 at 722 or refrain from transmitting SL RS in CC1. In some aspects, 1408 may be performed by transmission component 1534 of FIG. 15.

Figure 15:
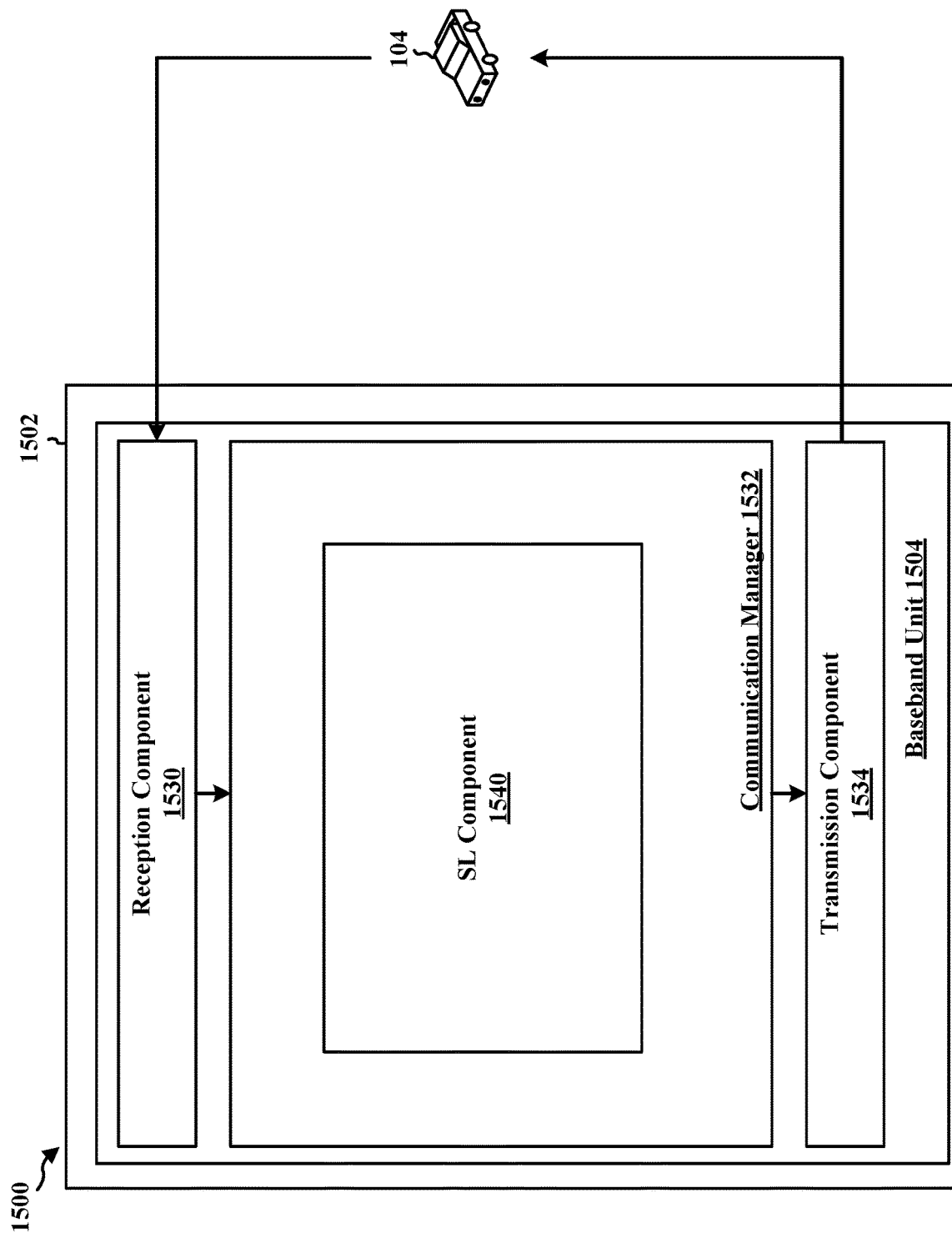
FIG. 15 is a diagram illustrating an example of a hardware implementation for an apparatus employing a processing system.

FIG. 15 is a diagram 1500 illustrating an example of a hardware implementation for an apparatus 1502. The apparatus 1502 is a wireless device and includes a baseband unit 1504. The baseband unit 1504 may communicate through a cellular RF transceiver with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. In some aspects, the reception component 1530 may be configured to receive, from a second UE, the SCI in the first CC; receive, from the second UE, a PSSCH in the first CC or the second CC; and receive one or more SL RS in the second CC, e.g., as described in connection with 1104 or 1106 of FIG. 11, or 1304, 1306, or 1308 of FIG. 13. In some aspects, the reception component 1530 may be further configured to receive, from a base station, a sidelink transmission grant, e.g., as described in connection with 1402 of FIG. 14. In some aspects, the transmission component 1534 may be configured to transmit, to the second UE, a PSFCH in the second CC, e.g., as described in connection with 1310 of FIG. 13. In some aspects, the transmission component 1534 may be further configured to transmit, to a second UE, the SCI a first CC; transmit, to the second UE, a PSSCH in the first CC or the second CC; and transmit one or more sidelink RS in the first CC, e.g., as described in connection with 1202 and 1204 of FIG. 12, or 1404, 1406, and 1408 of FIG. 14. The first CC may correspond to a dormant CC or a non-dormant CC. The second CC may correspond to a non-dormant CC or a dormant CC. The communication manager 1532 includes the one or more illustrated components. The components within the communication manager 1532 may be stored in the computer-readable medium/memory and/or configured as hardware within the baseband unit 1504. The baseband unit 1504 may be a component of the device 310/450 and may include the memory 360/376 and/or at least one of the TX processor 316/368, the RX processor 356/370, and the controller/processor 359/375.

The communication manager 1532 may include SL component 1540 that may be configured to monitor for SCI in a first CC and refrain from monitoring for the SCI in a second CC, e.g., as described in connection with 1102 of FIG. 11 or 1302 of FIG. 13. The first CC may correspond to a non-dormant CC, the second CC may correspond to a dormant CC.

In some aspects, the SL component 1540 may be further configured to refrain from transmitting one or more sidelink RS in the second CC (that may be dormant) and refrain from transmitting a PSFCH (that may be dormant) in the first CC, e.g., as described in connection with 1310 of FIGS. 13 and 1408 of FIG. 14.

The apparatus may include additional components that perform each of the blocks of the algorithm in the aforementioned flowcharts of FIGS. 11, 12, 13, and 14. As such, each block in the aforementioned flowcharts of FIGS. 11, 12, 13, and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for monitoring for SCI in a first CC and refraining from monitoring for the SCI in a second CC, the first CC corresponding to a non-dormant CC, the second CC corresponding to a dormant CC. In some aspects, the baseband unit 1504 may include means for receiving, from a second UE, the SCI in the first CC. In some aspects, the baseband unit 1504 may include means for receiving, from the second UE, a PSSCH in the first CC or the second CC. In some aspects, the baseband unit 1504 may include means for receiving one or more SL RS in the second CC. In some aspects, the baseband unit 1504 may include means for transmitting, to the second UE, a PSFCH in the second CC. In some aspects, the baseband unit 1504 may include means for refraining from transmitting a PSFCH in the second CC.

In some aspects, the baseband unit 1504 may include means for receiving, from a base station, a sidelink transmission grant. In some aspects, the baseband unit 1504 may include means for transmitting, to a second UE, SCI in a first CC, the first CC corresponding to a dormant CC for the first UE. In some aspects, the baseband unit 1504 may include means for transmitting, to the second UE, a PSSCH in the first CC or a second CC, the second CC corresponding to a non-dormant CC for the first UE. In some aspects, the baseband unit 1504 may include means for transmitting one or more sidelink RS in the first CC. In some aspects, the baseband unit 1504 may include means for refraining from transmitting one or more sidelink RS in the first CC. In some aspects, the baseband unit 1504 may include means for receiving, from the second UE, a PSFCH in the second CC or the first CC.

The aforementioned means may be one or more of the aforementioned components of the apparatus 1502 configured to perform the functions recited by the aforementioned means. As described supra, the apparatus 1502 may include the TX processor 316/368, the RX processor 356/370, and the controller/processor 359/375. As such, in one configuration, the aforementioned means may be the TX processor 316/368, the RX processor 356/370, and the controller/processor 359/375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first UE, comprising: a memory; and at least one processor coupled to the memory and configured to: monitor for SCI in a first CC and refrain from monitoring for the SCI in a second CC, the first CC corresponding to a non-dormant CC, the second CC corresponding to a dormant CC; receive, from a second UE, the SCI in the first CC; and receive, from the second UE, a PSSCH in the first CC or the second CC.

Aspect 2 is the apparatus of aspect 1, wherein the SCI comprises a scheduling of a set of time and frequency resources associated with the PSSCH and one or more transmission parameters associated with the PSSCH.

Aspect 3 is the apparatus of any of aspects 1-2, wherein the at least one processor coupled to the memory is further configured to: receive one or more SL RSs in the second CC.

Aspect 4 is the apparatus of any of aspects 1-3, wherein the PSSCH is received in the second CC, and wherein the at least one processor coupled to the memory is further configured to: transmit, to the second UE, a PSFCH in the second CC.

Aspect 5 is the apparatus of any of aspects 1-4, and wherein the at least one processor coupled to the memory is further configured to refrain from transmitting a PSFCH in the first CC.

Aspect 6 is the apparatus of any of aspects 1-5, wherein the first CC corresponds to a first dormant CC of the second UE and the second CC corresponds to a second non-dormant CC of the second UE.

Aspect 7 is the apparatus of any of aspects 1-7, further comprising a transceiver coupled to the at least one processor.

Aspect 8 is an apparatus for wireless communication at a first UE, comprising: a memory; and at least one processor coupled to the memory and configured to: transmit, to a second UE, SCI in a first CC, the first CC corresponding to a dormant CC for the first UE; and transmit, to the second UE, a PSSCH in the first CC or a second CC, the second CC corresponding to a non-dormant CC for the first UE.

Aspect 9 is the apparatus of aspect 8, wherein the SCI comprises a scheduling of a set of time and frequency resources associated with the PSSCH and one or more transmission parameters associated with the PSSCH.

Aspect 10 is the apparatus of any of aspects 8-9, wherein the at least one processor coupled to the memory is further configured to: transmit one or more SL RSs in the first CC.

Aspect 11 is the apparatus of any of aspects 8-10, wherein the PSSCH is transmitted in the second CC, and wherein the at least one processor coupled to the memory is further configured to: receive, from the second UE, a PSFCH in the second CC or the first CC.

Aspect 12 is the apparatus of any of aspects 8-11, wherein the first CC corresponds to a first non-dormant CC of the second UE and the second CC corresponds to a second dormant CC of the second UE.

Aspect 13 is the apparatus of any of aspects 8-12, wherein the at least one processor coupled to the memory is further configured to refrain from receiving a PSFCH in the second CC.

Aspect 14 is the apparatus of any of aspects 8-13, further comprising a transceiver coupled to the at least one processor.

Aspect 15 is a method of wireless communication for implementing any of aspects 1 to 7.

Aspect 16 is an apparatus for wireless communication including means for implementing any of aspects 1 to 7.

Aspect 17 is a computer-readable medium storing computer executable code, where the code when executed by a processor causes the processor to implement any of aspects 1 to 7.

Aspect 18 is a method of wireless communication for implementing any of aspects 8 to 14.

Aspect 19 is an apparatus for wireless communication including means for implementing any of aspects 8 to 14.

Aspect 20 is a computer-readable medium storing computer executable code, where the code when executed by a processor causes the processor to implement any of aspects 8 to 14.

What is claimed is:

1. An apparatus for wireless communication at a first user equipment (UE), comprising:
   a memory; and
   at least one processor coupled to the memory and configured to:
   transmit, to a second UE, sidelink (SL) control information (SCI) in a first component carrier (CC), the first CC corresponding to a dormant CC for the first UE, wherein the dormant CC for the first UE indicates a CC in which the first UE is not configured to monitor SCI transmitted from one or more UEs; and
   transmit, to the second UE, a physical sidelink shared channel (PSSCH) in the first CC or a second CC, the second CC corresponding to a non-dormant CC for the first UE, wherein the non-dormant CC for the first UE indicates a CC in which the first UE is configured to monitor SCI transmitted from one or more UEs.

2. The apparatus of claim 1, wherein the SCI comprises a scheduling of a set of time and frequency resources associated with the PSSCH and one or more transmission parameters associated with the PSSCH.

3. The apparatus of claim 1, wherein the at least one processor coupled to the memory is further configured to:
   transmit one or more SL reference signals (RS) in the first CC.

4. The apparatus of claim 1, wherein the PSSCH is transmitted in the second CC, and wherein the at least one processor coupled to the memory is further configured to:
   receive, from the second UE, a physical sidelink feedback channel (PSFCH) in the second CC or the first CC.

5. The apparatus of claim 1, wherein the first CC corresponds to a first non-dormant CC of the second UE and the second CC corresponds to a second dormant CC of the second UE.

6. The apparatus of claim 1, wherein the at least one processor coupled to the memory is further configured to refrain from receiving a physical sidelink feedback channel (PSFCH) in the second CC.

7. The apparatus of claim 1, further comprising a transceiver coupled to the at least one processor.

8. A method for wireless communication at a first user equipment (UE), comprising:
- transmitting, to a second UE, sidelink (SL) control information (SCI) in a first component carrier (CC), the first CC corresponding to a dormant CC for the first UE, wherein the dormant CC for the first UE indicates a CC in which the first UE does not monitor SCI transmitted from one or more UEs; and
- transmitting, to the second UE, a physical sidelink shared channel (PSSCH) in the first CC or a second CC, the second CC corresponding to a non-dormant CC for the first UE, wherein the non-dormant CC for the first UE indicates a CC in which the first UE monitors SCI transmitted from one or more UEs.

9. The method of claim 8, wherein the SCI comprises a scheduling of a set of time and frequency resources associated with the PSSCH and one or more transmission parameters associated with the PSSCH.

10. The method of claim 8, further comprising:
- transmitting one or more SL reference signals (RS) in the first CC.

11. The method of claim 8, wherein the PSSCH is transmitted in the second CC, and further comprising:
- receiving, from the second UE, a physical sidelink feedback channel (PSFCH) in the second CC or the first CC.

12. The method of claim 8, wherein the first CC corresponds to a first non-dormant CC of the second UE and the second CC corresponds to a second dormant CC of the second UE.

13. The method of claim 8, further comprising refraining from receiving a physical sidelink feedback channel (PSFCH) in the second CC.

* * * * *